United States Patent Office 2,879,253
Patented Mar. 24, 1959

2,879,253
COPOLYMERIZATION OF ACRYLONITRILE AND ANOTHER UNSATURATED MONOMER, IN THE PRESENCE OF PREFORMED HOMOPOLYMERS AND PRODUCTS OBTAINED THEREBY

Harry W. Coover, Jr., Kingsport, Tenn., assignor to Eastman Kodak Company, Rochester, N.Y., a corporation of New Jersey No Drawing. Application February 3, 1954
Serial No. 408,011

12 Claims. (Cl. 260—45.5)

This invention relates to modified polyacrylonitriles and to a process for their preparation.

This application is a continuation-in-part of my copending applications Serial No. 279,210, filed March 28, 1952 (now abandoned), and Serial No. 316,057, filed October 21, 1952 (now abandoned).

In copending application Serial No. 164,854, filed May 27, 1950 (now United States Patent No. 2,649,434, dated August 18, 1953), Coover and Dickey, it is shown that valuable polymer products can be obtained by polymerizing acrylonitrile in the presence of preformed "live" homopolymers of various unsaturated monomeric compounds, i. e. homopolymers which have not been separated from their polymerization reaction mixture, the acrylonitrile being then added to the mixture and the polymerization continued to completion. In copending application Serial No. 198,761 (now United States Patent No. 2,620,434, dated December 2, 1953) filed December 1, 1950, of Coover and Dickey, it is shown that still other valuable polymer products can be obtained by polymerizing acrylonitrile in the presence of "dead" homopolymers and copolymers of various unsaturated monomeric compounds, i. e. polymers which have been first isolated from their polymerization reaction mixtures and then acrylonitrile polymerized in the presence of the isolated polymer. In copending application Serial No. 198,762 (now United States Patent No. 2,657,191, dated October 27, 1953) filed December 1, 1950, of Coover and Dickey, it is shown that other valuable polymer products can be obtained by polymerizing acrylonitrile in the presence of "live" interpolymers of various unsaturated monomeric compounds. The processes used in the above applications are all concerned with the homopolymerization of acrylonitrile in the presence of a preformed polymer. Modified acrylonitrile polymers of this kind can be spun into fibers having greatly increased moisture and dyeability. Such fibers have, in addition, all the other desirable physical properties exhibited by fibers produced from straight polyacrylonitrile. They can readily be dry or wet spun into high strength fibers exhibiting various degrees of extensibility depending upon the extent to which and the conditions under which the fibers were drafted. For example, if the fibers are drafted over a range of 100–600 percent and relaxed, the extensibility of the yarn will increase something on the order of 30 percent at low drafts down to 17 or 18 percent at high drafts. Under the maximum drafting and relaxing conditions, it is not possible with these polymers to obtain fibers having extensibility exceeding 30 percent and still retaining tenacity in the order of 2.5–3.0 grams per denier. However, from a textile point of view, it would be highly desirable to be able to produce fibers having not only the outstanding properties such as moisture absorption, dye affinity and other valuable physical properties, but also an extensibility in the range of 30–50 percent.

Polymers prepared according to the processes of the above pending applications can be dissolved in common acrylonitrile polymer solvents up to a limit of about 20 percent solids to give solutions or dopes which are practical for high temperature dry or wet spinning processes. Higher concentrations of these polymers cannot be used due to the tendency of the polymer dopes to set up in the form of a gel. However, from a production point of view, it is highly desirable to be able to prepare dopes containing higher concentrations of polymer, i. e. 25 percent or higher, because such higher solids dopes make it possible to produce fibers at a much faster rate. Furthermore, a higher solids solutions would be more practical in that less solvent is required per pound of polymer; also the actual spinning costs are less in that less solvent per pound of spun fiber has to be extracted in the wet spinning process or volatilized in a dry spinning process. Another consideration is that in wet or dry spinning processes, especially for high solids dopes, it is necessary to filter the solution free of extraneous materials and gelled particles that may be present so that they will not plug the spinneret. To faciliate filtration, it is necessary to maintain solution temperatures sufficiently high to dissolve completely the polymer and give a homogeneous solution. However, it is well known that solutions of acrylonitrile polymers discolor on heating, which results in poor yarn color. Accordingly, from a product and high quality yarn point of view, it would be highly desirable to provide an acrylonitrile polymer which could be dissolved to give dopes having polymer solids content substantially greater than 25 percent which at the same time could be filtered at relatively low temperatures, thereby making it possible to produce yarns at lower costs and having greatly improved color.

I have now made the unusual and valuable discovery that when small amounts of a modifying unsaturated monomer are copolymerized with acrylonitrile in the presence of certain "live" modifying homopolymers, i. e. homopolymers which have not been separated from their polymerization reaction mixtures, the products obtained show not only good moisture absorption and dyeability, but other greatly improved properties which are especially valuable for textile purposes. For example, I have found that polymers prepared in accordance with the invention are much more readily soluble in acrylonitrile polymer solvents, and their solutions or dopes can be made up to contain from 25–40 percent polymer solids, and that such dopes remain clear, flowable and filterable without any gelling at temperatures below 100° C. in contrast to hitherto known high solids acrylonitrile polymer dopes which still exhibit gelling effects at temperatures substantially above 100° C., for example 110° C. and even higher, and result in discolored fiber and yarn. Furthermore, when the polymers of the invention are spun either by dry spinning or wet spinning processes, the fibers obtained can be more readily drafted and exhibit greatly improved extensibility for any given tenacity, i. e. in the range of 40–50 percent.

It is, accordingly, an object of the invention to provide a new class of modified acrylonitrile polymers or compositions. Another object is to provide a process for preparing these new polymers. Still another object is to provide homogeneous solutions having a polymer solids content of from about 25–40 percent, based on the total weight of the solution. A further object is to provide improved fibers from these compositions and from solutions thereof. Other objects will become apparent hereinafter.

In accordance with the invention, I prepare my new compositions or polymers by subjecting to polymerizing conditions a dispersion of from 5 to 95 parts by weight of a mixture comprising from 85.0 to 99.5 percent by weight of acrylonitrile and from 15.0 to 0.5 percent by weight of one or more other different monoethylenically unsaturated, polymerizable compounds containing a

I. $-CH=C<$ group, or more especially a

II. $\quad CH_2=C<$ group, in the presence of from 95 to 5 parts by weight of a "live" homopolymer, until from about 70% to substantially 100% of the monomers present have been converted to polymer, the said homopolymer being still retained in its original polymerization reaction mixture and employed in this form in my invention. The above mentioned modifying homopolymer may be prepared by polymerizing the monomer to the point where from 70% to substantially 100% of the monomer selected from the group consisting of acrylamides, maleamides, fumaramides, itaconamides, citraconamides, maleamates, fumaramates, itaconamates, citraconamates, acrylates and vinyl carboxylic esters has been converted to the homopolymer. Since the homopolymer is employed in my invention without separation from its polymerization reaction mixture, it will be understood that where the conversion of the monomer to polymer is less than 100%, the remaining monomer will function similar to the other monoethylenically polymerizable, unsaturated compounds and copolymerize therewith and with the acrylonitrile in the graft polymerization step. An alternate method for preparing generally similar resinous compositions, is to employ a "reverse" process, i.e. wherein from 5 to 95 parts by weight of a mixture, containing as the sole polymerizable components from 85.0 to 99.5 percent by weight of acrylonitrile and from 15.0 to 0.5 percent by weight of one or more of the other different monoethylenically unsaturated, polymerizable compounds containing a $—CH=C<$ group, is first substantially completely copolymerized to the copolymer, and then without separating the copolymer from its polymerization reaction mixture, adding to the mixture from 95 to 5 parts by weight of a monomer selected from the above mentioned group acrylamides, maleamides, fumaramides, itaconamides, citraconamides, maleamates, fumaramates, itaconamates, citraconamates, acrylates and vinyl carboxylic esters, until from 70% to substantially 100% of the added monomer is polymerized.

Those of my new compositions, prepared according to either of the described methods, which contain from 60 to 95 percent by weight of acrylonitrile have been found to be especially useful as fiber-forming materials. However, all of our compositions in the 5 to 95 percent range of acrylonitrile content are compatible with each other, with polyacrylonitrile and with other acrylonitrile polymers containing 85 percent or more by weight of acrylonitrile, in all proportions, but the most useful mixtures comprise from 5 to 95 parts by weight of one or more of the polymers of the invention with from 95 to 5 parts by weight of polyacrylonitrile. Monomers whose polymers were not heretofore compatible with polyacrylonitrile can thus be polymerized according to my invention to give polymers which are highly compatible with polyacrylonitrile.

The acrylamides whose polymers can be advantageously used in my invention comprise those represented by the following general formula III. 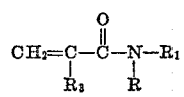

wherein one of R and $R_1$ represents a hydrogen atom or an alkyl group containing from 1 to 4 carbon atoms (e.g. methyl, ethyl, propyl, isopropyl, butyl, isobutyl, etc. groups), the other of R and $R_1$ represents an alkyl group containing from 1 to 4 carbon atoms, such as those just referred to, and $R_3$ represents a hydrogen atom or a methyl group. Typical acrylamides include, N-methyl acrylamide, N-ethyl acrylamide, N-isopropyl acrylamide, N-n-butyl acrylamide, N-methyl methacrylamide, N-ethyl methacrylamide, N-isopropyl methacryl-amide, N,N-dimethyl acrylamide, N,N-diethyl acrylamide, N,N-dimethyl methacrylamide, etc.

As maleamides, I can advantageously use those represented by the following general formula:

IV. 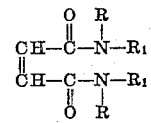

wherein R and $R_1$ are as above defined. Typical maleamides include maleamide, N-methyl maleamide, N-ethyl maleamide, N-propyl maleamide, N-isopropyl maleamide, N-n-butyl maleamide, N,N'-dimethyl maleamide, N,N'-diethyl maleamide, N,N'-di-n-butyl maleamide, N-methyl-N'-ethyl maleamide, N,N'-tetramethyl maleamide, N,N'-tetraethyl maleamide, N,N-dimethyl-N',N'-diethyl maleamide, etc.

As fumaramides, I can advantageously use those represented by the following general formula:

V. 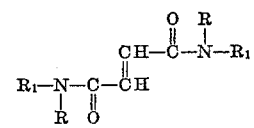

wherein R and $R_1$ are as above defined. Typical fumaramides include fumaramide, N-methyl fumaramide, N-ethyl fumaramide, N-propyl fumaramide, N-isopropyl fumaramide, N-n-butyl fumaramide, N,N'-dimethyl fumaramide, N,N'-diethyl fumaramide, N,N'-di-n-butyl fumaramide, N-methyl-n'-ethyl fumaramide, N-methyl-n'-butyl fumaramide, N,N'-tetramethyl fumaramide, N,N'-tetraethyl fumaramide, N,N-dimethyl-N',N'-diethyl fumaramide, etc.

As itaconamides, I can advantageously use those represented by the following general formula:

VI. 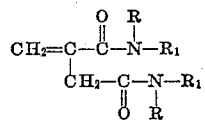

wherein R and $R_1$ are as above defined. Typical itaconamides include itaconamide, N-methyl itaconamide, N-ethyl itaconamide, N-n-butyl itaconamide, N,N'-dimethyl itaconamide, N,N'-diethyl itaconamide, the N,N'-butyl itaconamides, N,N'-tetramethyl itaconamide, etc.

As citraconamides, I can advantageously use those represented by the following general formula:

VII. 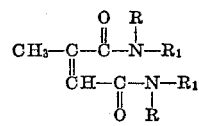

wherein R and $R_1$ are as above defined. Typical citraconamides include citraconamide, N-methyl citraconamide, N-ethyl citraconamide, N-n-butyl citraconamide, N,N'-dimethyl citraconamide, N,N'-diethyl citraconamide, the N,N'-butyl citraconamides, N,N'-tetramethyl citraconamide, etc.

The maleamates whose polymers I can advantageously use comprise those represented by the following general formula:

VIII. 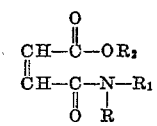

wherein R and $R_1$ are as above defined and $R_2$ represents an alkyl group containing from 1 to 4 carbon atoms. Typical maleamates include methyl maleamate, ethyl maleamate, propyl maleamate, n-butyl maleamate, N-methyl methyl maleamate, N-ethyl methyl maleamate, the N-butyl methyl maleamates, the N-methyl butyl maleamates, N-dimethyl methyl maleamate, N-dimethyl ethyl maleamate, N-dimethyl n-butyl maleamate, the N-dibutyl methyl maleamates, etc.

A fumaramates, I can advantageously use those represented by the following general formula:

IX.
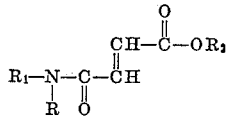

wherein R, $R_1$ and $R_2$ are as above defined. Typical fumaramates include methyl fumaramate, ethyl fumaramate, propyl fumaramate, n-butyl fumaramate, N-methyl methyl fumaramate, N-methyl ethyl fumaramate, the N-methyl butyl fumaramates, N-dimethyl methyl fumaramate, N-dimethyl ethyl fumaramate, N-dimethyl N-butyl fumaramate, the N-dibutyl methyl fumaramates, etc.

As itaconamates, I can advantageously use those represented by the following general formulas:

X.
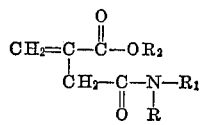

and

XI.
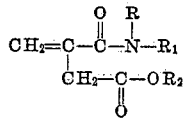

wherein R, $R_1$ and $R_2$ are as above defined. Typical itaconamates include methyl itaconamate, ethyl itaconamate, propyl itaconamate, the butyl itaconamates, N-methyl methyl itaconamate, N-methyl ethyl itaconamate, N-methyl propyl itaconamate, N-methyl n-butyl itaconamate, N-dimethyl methyl itaconamate, N-dimethyl ethyl itaconamate, N-dimethyl n-butyl itaconamate, the N-dibutyl methyl itaconamate, etc.

As citraconamates, I can advantageously use those represented by the following general formulas:

XII.
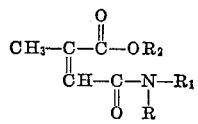

and

XIII.
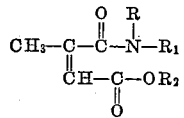

wherein R, $R_1$ and $R_2$ are as above defined. Tpical citraconamates include methyl citraconamate, ethyl citraconamate, propyl citraconamate, the butyl citraconamates, N-methyl methyl citraconamate, N-methyl ethyl citraconamate, N-methyl propyl citraconamate, N-methyl n-butyl citraconamate, N-dimethyl methyl citraconamate, N-dimethyl ethyl citraconamate, N-dimethyl n-butyl citraconamate, the N-dibutyl methyl citraconamates, etc.

The acrylates whose polymers I can advantageously use comprise those represented by the following general formula:

XIV.
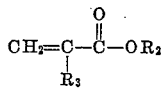

wherein $R_2$ and $R_3$ are as above defined. Typical esters include methyl acrylate, ethyl acrylate, propyl acrylate, n-butyl acrylate, isobutyl acrylate, methyl methacrylate, ethyl methacrylate, propyl methacrylate, the butyl methacrylates, etc.

As vinyl carboxylic esters I can advantageously use those represented by the following general formula:

XV.
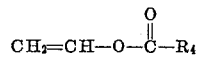

wherein $R_4$ represents an alkyl group containing from 1 to 3 carbon atoms. Typical esters include vinyl formate, vinyl acetate, vinyl propionate, vinyl butyrate, etc.

The monoethylenically unsaturated, polymerizable organic compounds represented by Formulas I and II above include the compounds represented by Formulas III to XV, in addition to other monomeric compounds coming within the scope thereof, such as styrene, α-methylstyrene, p-acetaminostyrene, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diisopropyl maleate, dimethyl fumarate, diethyl fumarate, diisopropyl fumarate, acrylic acid, methacrylic acid, fumaronitrile, methacrylonitrile, N-vinyl phthalimide, vinyl butyrate, vinyl sulfonamide, ethylene, isobutylene, etc.

Advantageously, the polymerizations are carried out in aqueous medium, although other reaction media such as organic solvents can be employed. For example, a polymerization medium consisting of aqueous acetone or other aqueous solvent can be used. The polymerizations can be accelerated by heat, by actinic light such as ultra violet and by the use of well-known polymerization catalysts. Such catalysts are commonly used in the art of polymerization, and our invention is not to be limited to any particular catalyst material. Catalysts which have been found to be especially useful comprise the peroxide polymerization catalysts, such as the organic peroxides (e.g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e.g. alkali metal perborates, such as those of sodium and potassium, etc.), persulfates (e.g. alkali metal persulfate, ammonium persulfate, etc.). Other catalyst such as the ketazines, azines, etc. can be used. The quantity of catalyst used can be varied, depending on the monomer, amount of diluent, etc. Sufficient catalyst can be used to homopolymerize the ethenoid monomer selected from those represented by the above general formulas, and the monomeric acrylonitrile, or an amount of catalyst sufficient to polymerize only the ethenoid monomer can be used, and additional catalyst can be added with the acrylonitrile monomer to complete the polymerization. The catalyst added along with acrylonitrile may be the same catalyst that was used to polymerize the other ethenoid monomer. I have found that it is especially advantageous to use an amount of catalyst sufficient to polymerize only the first monomer, and then upon addition of the acrylonitrile to add a further amount of catalyst at that time. This procedure provides a readier means for regulating the molecular weight distribution of the polymer composition.

The temperatures at which the process of my invention can be carried out from ordinary room temperature to the reflux temperature of the reaction mixture. Generally, a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers (e. g. aryloxy polyalkylene ether sulfonates, such as Triton 720), etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

Instead of using an aqueous medium in the polymerizations, it is also possible to use organic solvents such as acetonitrile, aromatic hydrocarbons such as benzene, toluene, etc., liquid alkanes such as n-heptane, etc., aliphatic ethers, acetone, etc. Organic solvents which are water-soluble can be used with water in the polymerization. The term dispersion as used herein is intended to include both true solutions and emulsions.

The polymerizations can also be carried out in continuous manner, especially in the second step of polymerization, i. e. wherein the acrylonitrile and the other polymerizable monomer or monomers are copolymerized in the presence of the "live" homopolymer. The products formed by this method have a number of advantages. They are more homogenous and have certain improved properties, for example, such as better solubility as compared with products obtained from analogous batch processes. The continuous polymerizations contemplated herein fall into two main groups: (1) those which are used in equipment which permits the continuous addition of reactants and the continuous removal of product and (2) those which are used in bath reactions wherein one or more of the reactants is added continuously during the course of the polymerization, but from which no material is removed during the reaction (continuous batch process). In the preferred process, acrylonitrile and the other monomer or monomers containing the specified amount of a regulator such as tertiary dodecyl mercaptan is placed in a suitable storage or supply vessel under an atmosphere of nitrogen. In another supply vessel, there is placed under nitrogen a mixture of air-free deionized water, an appropriate amount of the "live" homopolymer contained in its polymerization reaction mixture, which may contain some unreacted monomer, an appropriate amount of additional catalyst and an acidic reagent such as phosphoric acid for adjusting the pH of the reaction mixture. A third vessel contains an activator such as potassium metabisulfite in solution in air-free, deionized water.

The preferred procedure is to draw continuously appropriate amounts of solutions or dispersions from the supply vessels into a reactor, subject the mixture to polymerizing conditions and continuously remove from the reactor the modified polymer containing from 5 to 95% by weight of combined acrylonitrile. By this means from 70% to substantially 100% of the monomers can be converted to the modified polymer. The length of time between the addition of ingredients into the reactor and removal thereof as the modified polymer is defined as the contact time. At equilibrium, the polymer emulsion or slurry is removed from the reactor by suitable means at the same total rate as ingredients from the supply vessels are being added. Thus, the contact time in the reactor can be conveniently controlled by the absolute rate of addition of the ingredients. Usually, the contact time is between 1 and 3 hours, although longer periods in some cases are advantageous. It will be understood, however, that the above process can be varied in a number of ways. For example, the ingredients to be added can be combined or separated by using a larger number of vessels, or as a practical minimum—two storage vessels, one for the activator and one for the other ingredients. Also the other monomer can be added to the reactor separately or in combination with the acrylonitrile or in combination with one or more of the other ingredients.

In the other continuous process, i. e. the continuous batch process, the various ingredients can also be added to the reactor in a number of ways, for example as follows: (a) the catalyst, activator, acid component, homopolymer modifier, water, etc., are placed in the reaction vessel, and the monomers and regulator are added continuously; (b) the monomers, regulator, catalyst, acid component, homopolymer modifier, water, etc., are placed in the reaction vessel, and the activator is added continuously; (c) the monomers, regulator, activator, acid component, homopolymer modifier, water, etc., are placed in the reaction vessel, and the catalyst is added continuously; (d) the monomers, regulator, acid component, homopolymer modifier, water, etc., are placed in the reaction vessel, and both catalyst and activator, combined or separate, are added continuously; (e) the homopolymer modifier, catalyst, acid component and water are placed in the reaction vessel, and the monomers and activator, combined or separate, are added continuously; (f) processes similar to (a) through (e), except that the acid component is eliminated; and (g) processes similar to (a) through (f), except that the activator is eliminated. For further details of the continuous process, reference can be had to copending application of Coover and Shields, Serial No. 407,954, filed of even date herewith.

The following examples will serve to illustrate further the manner whereby I practice my invention.

*Example 1*

2 g. of N-methylmethacrylamide was dissolved in 80 cc. of water along with 0.02 g. of potassium persulfate and 0.02 g. of sodium bisulfite. The solution was allowed to polymerize for 16 hours at 25° C. There was then added 7.6 g. acrylonitrile, 0.4 g. N-methylmethacrylamide, 0.1 g. potassium persulfate, and 0.1 g. sodium bisulfite, and the mixture was allowed to polymerize 8 hours at 25° C. The polymer product was then separated from the reaction mixture by filtration yielding 9.2 g. The polymer was readily soluble in such solvents as N,N-dimethylformamide, N,N - dimethylacetamide and $\gamma$-butyrolactone to give clear, gel-free solutions. Fibers obtained by extruding a solution of the polymer into a precipitating bath had a tenacity of 3.4 g./den., extensibility of 25 percent and a sticking temperature of 240° C. Fibers showed excellent affinity for all classes of dyes.

*Example 2*

2 g. of vinyl acetate was suspended in 18 cc. of water along with 0.02 g. of ammonium persulfate, 0.02 g. of sodium bisulfite, and 1.1 g. of a sulfonated ether (Triton 720). The resulting emulsion was allowed to polymerize for 16 hours at 50° C., then cooled to room temperature and a dispersion containing 6.8 g. acrylonitrile, 1.2 g. vinyl acetate, 0.1 g. ammonium persulfate, 0.1 g. sodium bisulfite, and 1 g. of a sulfonated ether (Triton 720) in 50 cc. of water was added. After tumbling the resulting emulsion at 40° C. for 2 hours, the polymer product was precipitated by the addition of a sodium chloride solution to give 9.7 g. of product. Fibers were then spun by extruding a solution of the polymer in dimethylformamide into a precipitating bath. The fiber thus obtained had a tenacity of 3.3 g./den., extensibility of 45 percent, a sticking temperature of 200° C., and shrank only 10 percent in boiling water. The fibers showed excellent affinity for acetate dyes.

*Example 3*

1 g. of N-methylacrylamide was dissolved in 50 cc. of water containing 0.02 g. of potassium persulfate. The solution was heated at 50° C. for 16 hours and the solution cooled to room temperature. There was then added 8 g. acrylonitrile, 1 g. N-methylacrylamide, 0.1 g. potassium persulfate and 0.1 g. sodium bisulfite. The reaction mixture was then allowed to stand at 25° C. for 16 hours. The precipitated polymer weighed 8.5 g. and contained 20 percent by weight of N-methylmethacrylamide. Fibers were then spun by extruding a solution of the polymer in N,N-dimethylacetamide into a precipitating bath. The fibers thus obtained had a tenacity of 3.5 g./den., extensibility of 35 percent, and a sticking temperature of 220° C. Fibers showed excellent affinity for all classes of dyes. Contrasted with the fibers obtained above, fibers obtained from an interpolymer containing 80 percent by weight of acrylonitrile and 20 percent by weight of N-methylacrylamide had a tenacity of 2.7 g./den., extensibility of 10 percent, a sticking temperature of 130° C., and shrank 25 percent when held for 30 seconds in a relaxed state in boiling water. Fibers obtained from a mechanical mixture containing 20 percent by weight of poly N-methylacrylamide and 80 percent by weight of polyacrylonitrile had a tenacity of 2.6 g./den., extensibility of 13 percent, a sticking temperature of 180° C., and shrank only 10 percent in boiling water. The fibers obtained from the mechanical mixture stiffened when dyed by normal methods for dyeing fabrics and fibers.

*Example 4*

4 g. of vinyl acetate was suspended in 40 cc. of water containing 0.04 g. of ammonium persulfate, 0.04 g. sodium bisulfite, and 2.2 g. of a sulfonated ether (Triton 720). The resulting emulsion was allowed to polymerize for 16 hours at 50° C., then cooled to room temperature. A dispersion containing 5.1 g. acrylonitrile, 0.9 g. N-methylmethacrylamide, 0.1 g. potassium persulfate, 0.1 g. sodium bisulfite, and 2 g. of a sulfonated ether (Triton 720) in 50 cc. water was added. The reaction mixture was tumbled for 2 hours at 50° C. There was thus obtained 9.4 g. polymer product containing 43 percent by weight of vinyl acetate and 15 percent N-methylmethacrylamide.

*Example 5*

1 g. N,N-dimethylacrylamide was dissolved in 10 cc. water containing 0.01 g. of potassium persulfate and 0.01 g. of sodium bisulfite. The solution was heated for 12 hours at 35° C. and 18.9 g. acrylonitrile, 0.1 g. N-methylmethacrylamide, 0.1 g. potassium persulfate and 0.1 g. sodium bisulfite in 100 cc. water was added and the solution was tumbled an additional 8 hours at 35° C. The precipitated polymer product was obtained in a 92 percent yield and was soluble in N,N-dimethylformamide, N,N-dimethylacetamide, or γ-butyrolactone. Fibers obtained from these solutions had a sticking temperature of 230° C.

*Example 6*

0.8 g. citraconamide, 0.01 g. potassium persulfate, 1 cc. 7-ethyl-2-methylundecan-4-sulfonic acid sodium salt (Tergitol No. 4) was added to 30 cc of water. The resulting emulsion was tumbled at 50° C. for 12 hours, at the end of which time 6.8 g. acrylonitrile, 1.2 g. citraconamide and 0.1 g. potassium persulfate in 70 cc. of water was added. The reaction mixture was then tumbled for an additional 12 hours at 50° C. The resulting polymer was obtained in 88 percent yield and contained 18 percent by weight of citraconamide by analysis. It was readily soluble in the acrylonitrile-type solvents. Fibers obtained by extruding a solution of the polymer in γ-butyrolactone into a precipitating bath had a sticking temperature of 225° C. and showed an excellent affinity for acetate dyes.

*Example 7*

1.3 g. itaconamide, 0.1 g. ammonium persulfate, 0.1 g. sodium bisulfite, and 1 g. of a sulfonated ether (Triton 720) were added to 50 cc. of distilled water. The resulting emulsion was then heated for 12 hours at 45° C. with tumbling. A solution of 15.3 g. acrylonitrile, 1.7 g. itaconamide, 0.2 g. ammonium persulfate, and 0.2 g. sodium bisulfite in 50 cc. of distilled water was then added. The reaction mixture was tumbled for an additional 8 hours at 35° C. The resulting polymer was obtained in an 80 percent yield and contained 14 percent by weight of itaconamide by analysis. Fibers obtained by extruding a solution of the polymer obtained in the above example in a solution such as N,N-dimethylformamide into a precipitating bath had a tenacity of 3.9 g./den., extensibility of 37 percent, a sticking temperature of 225° C., and shrank 7 percent in boiling water.

*Example 8*

2 g. methylmethacrylate was suspended in 30 cc. of water containing 0.01 g. ammonium persulfate, 0.01 g. sodium bisulfite and 1 g. of a sulfonated ether (Triton 720). The resulting emulsion was then tumbled for 8 hours at 50° C. and after cooling to room temperature, an emulsion of 7.5 g. acrylonitrile, 0.5 g. methylmethacrylate, 0.1 g. ammonium persulfate, 0.1 g. sodium bisulfite, and 1 g. of a sulfonated ether (Triton 720) in 70 cc. of water was added. After tumbling the reaction mixture for an additional 8 hours at 40° C., a polymer product was obtained which contained 26 percent methylmethacrylate by analysis. It was soluble in N,N-dimethylformamide or N,N-dimethylacetamide. Fibers obtained from this polymer had a sticking temperature of 190° C.

*Example 9*

2 g. methylacrylate was suspended in 30 cc. water containing 0.01 g. 90 percent hydrogen peroxide and 1 g. of a sulfonated ether (Triton 720). The resulting emulsion was tumbled for 12 hours at 50° C., and after cooling to room temperature, 7.6 g. acrylonitrile, 0.4 g. N,N-dimethylmethacrylamide, 0.1 g. 90 percent hydrogen peroxide solution, and 1 g. of a sulfonated ether (Triton 720) in 80 cc. of water was added. After tumbling for an additional 12 hours at 50° C., the polymerization was substantially complete. The resulting polymer contained 19 percent methylacrylate by analysis and was soluble in such solvents as γ-butyrolactone, N,N-dimethylformamide, N,N-dimethylacetamide, etc.

*Example 10*

1.8 g. N-isopropylacrylamide was dissolved in 50 cc. of water containing 0.1 g. potassium persulfate. The solution was heated for 12 hours at 50° C., and after cooling to room temperature, there was added 7.8 g. acrylonitrile, 0.2 g. N-isopropylacrylamide, 0.1 g. potassium persulfate, and 0.1 g. sodium bisulfite in 50 ml. water. The reaction mixture was then heated an additional 8 hours at 35° C. The resulting polymer was readily soluble in acrylonitrile solvents and gave fibers having an extensibility of 35 percent and a sticking temperature of 210° C.

*Example 11*

9.7 g. of N,N'-dimethylfumaramide were suspended in 100 cc. of distilled water along with 0.1 g. of ammonium persulfate, 0.1 g. of sodium bisulfite and 1 g. of a sulfonated ether (Triton 720). The resulting emulsion was allowed to polymerize for 16 hours at 50° C. and then cooled down to room temperature. A solution of 0.5 g. of acrylonitrile, 0.05 g. of methacrylonitrile, 0.01 g. of ammonium persulfate and 0.01 g. of sodium bisulfite in 10 cc. of water was added and the polymerization completed by tumbling at 50° C. for 8 hours. The emulsion was broken by the addition of a concentrated salt solution, and the precipitated polymer was filtered, washed, and dried.

Fibers obtained from a mechanical mixture containing 30 percent by weight of the polymer obtained and 70 percent by weight of an acrylonitrile polymer containing 90 percent acrylonitrile and 10 percent methacrylonitrile, by extruding a solution of the mixture in N,N-dimethylformamide into a precipitating bath, had a tenacity of 3.5 g. per denier, an extensibility of 29 percent, a sticking temperature of 200° C., and shrank 10 percent in boiling water.

*Example 12*

2 g. of N,N,N',N'-tetramethylfumaramide were emulsified in 80 cc. of water containing 2 g. of potassium laurate, 0.02 g. of potassium persulfate and 0.02 g. of sodium bisulfite. The emulsion was allowed to polymerize for 16 hours at 25° C. There were then added 7.6 g. of acrylonitrile, 0.4 g. of methylacrylate, 0.1 g. of potassium persulfate and 0.1 g. of sodium bisulfite, and the emulsion was allowed to polymerize for 8 hours at 25° C. The polymer product was then separated from the reaction mixture by filtration, yielding 9.2 g. On analysis the polymer was found to contain 20.5 percent by weight of N,N,N',N'-tetramethylfumaramide.

The polymers can be mixed with polyacrylonitrile in all proportions and dissolved to give stable solutions which do not separate into distinct layers on standing and from which fibers and films of homogeneous character can be spun, extruded or cast.

*Example 13*

2 g. of N,N'-di-isopropylfumaramide were suspended in 18 cc. of water along with 0.02 g. of ammonium persulfate, 0.02 g. of sodium bisulfite and 1.1 g. of a sulfonated ether (Triton 720). The resulting emulsion was allowed to polymerize for 12 hours at 50° C., then cooled to room temperature, and a dispersion containing 6.8 g. of acrylonitrile, 1.2 g. of N-methylmethylacrylamide, 0.1 g. of ammonium persulfate, 0.1 g. of sodium bisulfite and 2 g. of a sulfonated ether (Triton 720) in 50 cc. of water were added. After tumbling the resulting emulsion at 50° C. for 2 hours, the polymer product was precipitated by the addition of a sodium chloride solution to give 9.7 g. of product containing 19.5 percent by weight of N,N'-di-isopropylfumaramide.

Fibers obtained from a solution of a mechanical mixture of 5 parts polyacrylonitrile and 95 parts of the above polymer and extruding the solution into a precipitating bath, had a tenacity of 3.2 g. per denier, an extensibility of 30 percent, a sticking temperature of 215° C., and shrank 7 percent in boiling water.

*Example 14*

2 g. of N,N'-diethylmaleamide were emulsified in 100 cc. of water containing 1.1 g. of a sulfonated ether (Triton 720), and 0.04 g. of potassium persulfate. The emulsion was heated at 50° C. for 16 hours, and the emulsion cooled to room temperature. There were then added 7.96 g. of acrylonitrile and 0.04 g. of N-methylacrylamide, 0.1 g. of potassium persulfate and 0.1 g. of sodium bisulfite. The reaction mixture was then allowed to stand at 25° C. for 16 hours. The precipitated polymer weighed 8.8 g. and contained 20 percent by weight of N,N'-diethylmaleamide.

Fibers were then spun by extruding a solution of the polymer in N,N-dimethylformamide into a precipitating bath. The fibers thus obtained had a tenacity of 3.5 g. per denier, an extensibility of 23 percent, a sticking temperature of 215° C. and shrank only 7 percent in boiling water.

Contrasted with the fibers obtained above, fibers obtained from an interpolymer containing 20 percent by weight of N,N'-diethylmaleamide, 0.5 percent N-methylacrylamide, and 79.5 percent acrylonitrile had a tenacity of 2.2 g. per denier, an extensibility of 14 percent, a sticking temperature of 165° C., and shrank 28 percent in boiling water.

*Example 15*

7.5 g. of acrylonitrile, 0.5 g. of N,N'-dimethylmaleamide, were suspended in 50 cc. of water along with 0.1 g. ammonium persulfate, 0.1 g. of sodium bisulfite and 2 g. of a sulfonated ether (Triton 720). The resulting emulsion was allowed to polymerize at 50° C. for 2 hours, then cooled down to room temperature, and 2 g. of N,N'-dimethylmaleamide, 0.02 g. of ammonium persulfate and 0.02 g. of sodium bisulfite were added. After tumbling the reaction mixture at 50° C. for an additional 12 hours, the polymer product was precipitated by the addition of an aqueous solution of sodium chloride to give 9.8 g. of polymer product containing 20 percent by weight of N,N'-dimethylmaleamide.

Fibers were then spun from the product obtained above by extruding a solution of the polymer in γ-butyrolactone into a precipitating bath. The fibers thus obtained had a tenacity of 3.6 g. per denier, an extensibility of 28 percent, a sticking temperature of 215° C. and shrank 7 percent in boiling water.

Fibers obtained from a solution of a mechanical mixture of 10 parts polyacrylonitrile and 90 parts of the above polymer and extruding the solution into a precipitating bath, had a tenacity of 3.7 g. per denier, an extensibility of 25 percent, a sticking temperature of 220° C., and shrank 6 percent in boiling water.

*Example 16*

2 g. of N-methylmethylfumaramate were emulsified in 50 cc. of water containing 1 g. of a sulfonated ether (Triton 720) and 0.5 g. of ammonium persulfate. The resulting emulsion was heated at 50° C. for 12 hours, cooled to room temperature, and a mixture containing 7.6 g. acrylonitrile, 0.4 g. of N-methylmethylfumaramate, 0.1 g. sodium bisulfite were added. The reaction mixture was allowed to stand at 25° C. for 12 hours. The precipitated polymer weighed 9.6 g. and contained 24.5 percent by weight of N-methylmethylfumaramate.

Fibers obtained from this polymer had a tenacity of 3.3 g. per denier, an extensibility of 26 percent, a sticking temperature of 225° C., and shrank 7 percent in boiling water.

*Example 17*

4 g. of N,N-dimethylethylfumaramate were suspended in 40 cc. of water containing 0.04 g. of ammonium persulfate and 0.04 g. of sodium bisulfite and 2 g. of a sulfonated ether (Triton 720). The resulting emulsion was allowed to polymerize for 16 hours at 50° C., then cooled to room temperature, and a dispersion containing 5.4 g. of acrylonitrile, 0.6 g. of N,N-dimethylethylfumaramate, 0.1 g. potassium persulfate, 0.1 g. sodium bisulfite and 2 g. of a sulfonated ether (Triton 720) in 50 cc. of water was added. There was thus obtained 9.6 g. of polymer product containing 43.5 percent by weight of N,N-dimethylethylfumaramate.

The polymers can be mixed with polyacrylonitrile in all proportions and dissolved to give stable solutions which do not separate into distinct layers on standing and from which fibers and films of homogeneous character can be spun, extruded or cast.

*Example 18*

1 g. of N-isopropylmethylmaleamide was emulsified in 10 cc. of water containing 0.5 g. of potassium laurate, 0.01 g. of potassium persulfate and 0.01 g. of sodium bisulfite. The emulsion was heated for 12 hours at 35° C. and 18 g. of acrylonitrile, 1 g. of methyl acrylate, 0.1 g. of potassium persulfate, 0.1 g. of sodium bisulfite and 2 g. of potassium laurate in 100 cc. of water were added, and the polymerization was continued an additional 8 hours at 35° C. The precipitated polymer product was obtained in a 93 percent yield and contained 5 percent by weight of N-isopropylmethylmaleamide. It was soluble in N,N-dimethylformamide or N,N-dimethylacetamide. Fibers obtained from these solutions had a sticking temperature of 225° C. and an extensibility of 26 percent.

The polymers can be mixed with polyacrylonitrile in all proportions and dissolved to give stable solutions which do not separate into distinct layers on standing and from which fibers and films of homogeneous character can be spun, extruded or cast.

Example 19

2 g. of N,N-dimethylmethylitaconamate, 0.05 g. of potassium persulfate and 1 cc. of 7-ethyl-2-methylundecan-4-sulfonic acid sodium salt (Tergitol No. 4) were added to 30 cc. of water. The resulting emulsion was then tumbled at 50° C. for 12 hours at the end of which time 7.94 g. of acrylonitrile, 0.16 g. of methylcitraconamate and 0.1 g. of potassium persulfate in 70 cc. of water were added. The reaction mixture was then tumbled for an additional 12 hours at 50° C. The resulting polymer was obtained in a 93 percent yield and contained 19.5 percent by weight of N,N-dimethylmethylitaconamate by analysis. It was soluble in N,N-dimethylformamide or N,N-dimethylacetamide.

Fibers obtained from a solution of a mechanical mixture of 70 parts of polyacrylonitrile and 30 parts of the above polymer and extruding the solution into a precipitating bath, had a tenacity of 3.5 g. per denier, an extensibility of 24 percent, a sticking temperature of 215° C., and shrank 8 percent in boiling water.

Example 20

16 g. of acrylonitrile, 1 g. of N,N-dimethylmethylitaconamate were emulsified in 150 cc. of water containing 4 g. of a sulfonated ether (Triton 720), 0.2 g. of ammonium persulfate and 0.2 g. of sodium bisulfite. The resulting emulsion was heated for 8 hours at 35° C. An emulsion of 3 g. of methylcitraconamate, 0.1 g. of ammonium persulfate, 0.1 g. of sodium bisulfite and 1 g. of a sulfonated ether (Triton 720) and 20 cc. of distilled water were then added. The reaction mixture was then heated for an additional 12 hours at 45° C. The resulting polymer was obtained in a 93 percent yield and contained 15 percent by weight of methylcitraconamate. Fibers obtained by extruding a solution of the polymer obtained in the above example in a solvent such as γ-butyrolactone into a precipitating bath, had a tenacity of 3.8 g. per denier, an extensibility of 24 percent, a sticking temperature of 220° C., and shrank 7 percent in boiling water.

Fibers obtained from a solution of a mechanical mixture of 60 parts polyacrylonitrile and 40 parts of the above polymer and extruding the solution into a precipitating bath, had a tenacity of 3.9 g. per denier, an extensibility of 22 percent, a sticking temperature of 220° C., and shrank 7 percent in boiling water.

Example 21

9.5 g. of N-methylisopropylcitraconamate were suspended in 100 cc. of water containing 0.1 g. of ammonium persulfate, 0.1 g. of sodium bisulfite and 3 g. of a sulfonated ether (Triton 720). The resulting emulsion was then tumbled for 8 hours at 50° C. and after cooling to room temperature, 0.5 g. of acrylonitrile, 0.05 g. of N-methylisopropylcitraconamate, 0.05 g. of ammonium persulfate and 0.05 g. of sodium bisulfite were added. After tumbling the reaction mixture for an additional 3 hours at 40° C., a polymer product was obtained in a 95 percent yield.

The polymers can be mixed with polyacrylonitrile in all proportions and dissolved to give stable solutions which do not separate into distinct layers on standing and from which fibers and films of homogeneous character can be spun, extruded or cast.

Example 22

8.9 g. of N,N-dimethylbutylcitraconamate were suspended in 100 cc. of water containing 0.1 g. of ammonium persulfate, 0.1 g. of sodium bisulfite and 2.5 g. of a sulfonated ether (Triton 720). The resulting emulsion was then tumbled for 8 hours at 50° C., and after cooling to room temperature, 1 g. of acrylonitrile, 0.1 g. of N,N-dimethylbutylcitraconamate, 0.05 g. of ammonium persulfate and 0.05 g. of sodium bisulfite were added. After tumbling the reaction mixture for an additional 6 hours at 35° C., a polymer product was obtained which contained 9.9 percent acrylonitrile by analysis.

Fibers obtained from a solution of a mechanical mixture of 90 parts of a copolymer of acrylonitrile containing 95 percent acrylonitrile, 5 percent methylacrylate and 10 parts of the above polymer and extruding the solution into a precipitating bath, had a tenacity of 3.5 g. per denier, an extensibility of 29 percent, a sticking temperature of 215° C., and shrank 8 percent in boiling water.

Example 23

19 g. of N-ethylmethylmaleamide were suspended in 150 cc. of water along with 0.2 g. of ammonium persulfate, 0.2 g. of sodium bisulfite and 4 cc. of 7-ethyl-2-methylundecan-4-sulfonic acid sodium salt (Tergitol No. 4). The resulting emulsion was heated for 16 hours at 50° C., and after cooling to room temperature, there were added 10 g. of acrylonitrile, 1 g. of N-ethylmethylmaleamide, 0.1 g. ammonium persulfate and 0.1 g. of sodium bisulfite. The reaction mixture was heated for an additional 8 hours at 35° C. There was thus obtained a polymer in a 93 percent yield which contained 29 percent acrylonitrile by analysis.

Fibers obtained from a solution of a mechanical mixture of 80 parts polyacrylonitrile and 20 parts of the above polymer and extruding the solution into a precipitating bath, had a tenacity of 3.6 g. per denier, an extensibility of 26 percent, a sticking temperature of 220° C., and shrank 7 percent in boiling water.

Example 24

2 g. of N-isopropyl acrylamide was dissolved in 18 cc. of water along with 0.002 g. of potassium persulfate and 0.002 g. of potassium metabisulfite. The solution was allowed to polymerize at 25° C. to 70% conversion. There was then added 90 g. of water, 8 g. of acrylonitrile, 0.1 g. of potassium persulfate and 0.1 g. of potassium metabisulfite, and the mixture was allowed to polymerize at 35° C. to 75% conversion. The resulting polymer was immediately separated from the reaction mixture by filtration yielding 8 g. of polymer. The polymer was readily soluble in such solvents as N,N-dimethylformamide, N,N-dimethylacetamide and γ-butyrolactone to give clear, gel-free solutions. Fibers obtained by extruding a solution of the polymer into a precipitating bath had good physical properties as described in preceding examples.

Example 25

2 g. of N-isopropyl acrylamide was dissolved in 18 cc. of water along with 0.002 g. of potassium persulfate and 0.002 g. of potassium metabisulfite. The solution was allowed to polymerize at 25° C. to an 85% conversion. There was then added 90 g. of water, 8 g. of acrylonitrile, 0.1 g. of potassium persulfate, 0.1 g. of potassium metabisulfite and the mixture was allowed to polymerize at 35° C. to an 85% conversion. The resulting polymer was immediately separated from the reaction mixture by filtration yielding 8.8 g. of polymer. The polymer was soluble in such solvents as N,N-dimethylformamide, N,N-dimethylacetamide and γ-butyrolactone to give clear gel-free solutions. Fibers obtained by extruding a solution of the polymer into a precipitating bath had good physical properties.

Example 26

2 g. of N-methyl methacrylamide was dissolved in 80 cc. of water along with 0.02 g. of potassium persulfate and 0.02 of sodium bisulfite. The solution was allowed to polymerize for 16 hours at 25° C. There was then added 7.6 g. of acrylonitrile, 0.4 g. of N-methyl methacrylamide, 0.1 g. of potassium persulfate and 0.1 g. of sodium bisulfite, and the mixture was allowed to polymerize for several hours at 25° C. to a conversion of 80%. The polymer product was then isolated from the reaction mixture by filtration. The polymer was readily soluble in such solvents as N,N-dimethylformamide, N,N-dimethylacetamide and γ-butyrolactone to give clear, gel-free solutions. Fibers obtained by extruding a solution of the polymer into a precipitating bath had a tenacity of 3.5 g. per denier, an extensibility of 26%, and a sticking temperature of 230° C. Fibers showed excellent affinity for all classes of dyes.

*Example 27*

2 g. of vinyl acetate were suspended in 18 cc. of water along with 0.02 g. of ammonium persulfate, 0.02 g. of sodium bisulfite and 1.1 g. of a sulfonated ether (Triton 720). The resulting emulsion was allowed to polymerize at 50° C. to an 85% conversion. The reaction mixture was cooled to room temperature and a dispersion containing 6.8 g. of acrylonitrile, 1.2 g. of vinyl acetate, 0.1 g. of ammonium persulfate, 0.1 g. of sodium bisulfite and 1 g. of a sulfonated ether (Triton 720) in 50 cc. of water was added. After tumbling the resulting emulsion at 40° C. for 2 hours, the polymerization had proceeded essentially to completion and was precipitated by the addition of a sodium chloride solution to give 9.7 g. of product. Fibers were then spun by extruding a solution of the polymer in dimethylformamide into a precipitating bath. The fibers thus obtained had a tenacity of 3.4 g. per denier, an extensibility of 45%, a sticking temperature of 195° C., and shrank only 10% in boiling water. The fibers showed excellent affinity for acetate dyes.

*Example 28*

1 g. of N,N-dimethyl acrylamide was dissolved in 10 cc. of water containing 0.01 g. of potassium persulfate and 0.01 g. of sodium bisulfite. The solution was allowed to polymerize at 35° C. to a conversion of 88%. There was then added 8.9 g. of acrylonitrile, 0.1 g. of N-methyl acrylamide, 0.1 g. of potassium persulfate and 0.1 g. of sodium bisulfite in 100 cc. of water. The solution was tumbled at 35° C. and allowed to polymerize to a 75% conversion. The precipitated polymer product obtained was soluble in N,N-dimethylformamide, N,N-dimethylacetamide, etc. Fibers obtained from these solutions had a sticking temperature of 225° C.

*Example 29*

2 g. of methyl methacrylate was suspended in 30 cc. of water containing 0.01 g. of ammonium persulfate, 0.01 g. of sodium bisulfite and 1 g. of a sulfonated ether (Triton 720). The resulting emulsion was then tumbled at room temperature and allowed to polymerize to an 81% conversion. There was then added an emulsion of 7.5 g. of acrylonitrile, 0.5 g. of methyl methacrylate, 0.1 g. of ammonium persulfate, 0.1 g. of sodium bisulfite, and 1 g. of a sulfonated ether (Triton 720) in 70 cc. of water. The emulsion was tumbled and allowed to polymerize at 40° C. to a 90% conversion. The resulting polymer was readily soluble in N,N-dimethylacetamide. Fibers obtained from this polymer had a sticking temperature of 195° C.

*Example 30*

2 g. of N,N,N'N'-tetramethyl fumaramide were emulsified in 80 cc. of water containing 2 g. of potassium laurane, 0.02 g. of potassium persulfate and 0.02 g. of sodium bisulfite. The emulsion was allowed to polymerize for 16 hours at 25° C. There was then added 7.5 g. of acrylonitrile, 0.3 g. of methyl acrylate, 0.2 g. of vinyl acetate, 0.1 g. of potassium persulfate and 0.1 g. of sodium bisulfite, and the emulsion was allowed to polymerize for 8 hours at 25° C. The polymer product was separated from the reaction mixture by filtration yielding 9.7 g. On analysis the polymer was found to contain 20.5% by weight of N,N,N'N'-tetramethyl fumaramide. The polymer can be mixed with polyacrylonitrile or copolymers of acrylonitrile containing 85% or more acrylonitrile in all proportions and dissolved to give stable solutions which do not separate into distinct layers on standing and from which fibers and films of homogeneous character can be spun, extruded or cast.

*Example 31*

2 g. of N-methyl fumaramate were emulsified in 50 cc. of water containing 1 g. of a sulfonated ether (Triton 720) and 0.05 g. of ammonium persulfate. The resulting emulsion was heated at 50° C. for 12 hours, cooled to room temperature and a mixture containing 7.4 g. of acrylonitrile, 0.3 g. of N-methyl methyl fumaramate, 0.3 g. of N-methyl methacrylamide, 0.1 g. of sodium bisulfite were added. The reaction mixture was allowed to stand at 25° C. for 12 hours. The precipitated polymer weighed 9.6 g. Fibers obtained from this polymer had a tenacity of 3.5 g. per denier, an extensibility of 27%, a sticking temperature of 220° C., and shrank 8% in boiling water.

*Example 32*

2.5 g. of N-methylmethacrylamide and 0.5 g. acrylamide were dissolved in 75 ml. of water containing 0.05 g. of ammonium persulphate and 0.05 g. of sodium bisulfite. Polymerization was completed by heating at 35° C. for 12 hours. 4.2 g. of vinyl chloride, 2.8 g. of acrylonitrile, 0.1 g. ammonium persulphate and 0.1 g. sodium bisulfite were then added and polymerization completed by heating at 35° C. for an additional 12 hours. Precipitated polymer was obtained in 90 percent yield and contained 21 percent amide by analysis. The resultant polymer is soluble in methyl-ethylketone. Fibers obtained from the polymer have excellent affinity for dyes.

*Example 33*

1 g. of N-isopropylacrylamide was added to 100 ml. of water containing 0.05 g. of potassium persulphate and 0.05 g. of sodium bisulfite and 1 g. of orthophosphoric acid. Polymerization was completed by heating at 35° C. for 12 hours. 6.4 g. of acrylonitrile, 1.6 g. vinyl chloride, 0.1 g. potassium persulphate and 0.1 g. sodium bisulfite were added to the cooled reaction mixture and the polymerization completed by heating at 35° C. for an additional 8 hours. The precipitated polymer was obtained in a 90 percent yield and contained 18 percent amide by analysis. The polymer is solvent in such solvents as cyclohexanone and dimethylacetamide. The fibers obtained from this polymer show excellent affinity for dyes.

*Example 34*

4 g. of N,N-dimethylacrylamide were added to 100 ml. of water containing 0.01 g. of potassium persulphate and 0.01 g. of sodium bisulfite. Polymerization was completed by heating at 35° C. for 12 hours. 1.8 g. of acrylonitrile and 4.2 g. of vinyl chloride, 0.1 g. potassium persulphate and 0.1 g. of sodium bisulfite were added to the cooled reaction mixture and the polymerization was completed by heating at 35° C. for an additional 8 hours. The resultant polymer is soluble in such solvents as cyclohexanone, methylethylketone and dimethylformamide. Fibers obtained from this polymer show excellent affinity for dyes.

The preceding description and examples have set forth that the resinous compositions or polymers of the invention which contain from 60 to 95 percent by weight of acrylonitrile in the polymer molecule are especially useful for preparing fibers from their solutions or dopes in the mentioned solvents by wet or dry spinning processes. Good quality fibers can also be spun from dopes comprising a mixture of one or more of the resinous compositions of the invention with polyacrylonitrile, when used in such proportions that the combined total of acrylonitrile in the mixture of components is in the range of 60 to 95 percent by weight. However, all of the resinous compositions or polymers of the invention continuing from 5 to 95 percent by weight of acrylonitrile, including the mixtures of them with polyacrylonitrile in any proportions but preferably in the proportions of from 5 to 95 parts by weight of one or more of the polymers of the invention, and from 95 to 5 parts by weight of polyacrylonitrile, can be made up into solutions or dopes with one or more acrylonitrile polymer solvents, with or without added filters, pigments, dyes, plasticizers, etc., as desired, and the dopes coated onto a smooth surface to give flexible and tough films and sheet materials, which are useful for photographic film support and other purposes.

Other solvents which can be used for the preparation of fibers and coating compositions, etc., from the new resinous compositions or polymers of the invention, and mixtures thereof with each other, with polyacrylonitrile or with acrylonitrile polymers containing 85 percent or more of acrylonitrile, include ethylene carbonate, ethylene carbamate, γ - butyrolactone, N-methyl - 2 - pyrrolidone, N,N-dimethyl cyanamide, N,N-dimethyl cyanoacetamide, N,N-dimethyl-β-cyanopropionamide, glycolonitrile (formaldehyde cyanohydrin), malononitrile, ethylene cyanohydrin, dimethyl-sulfoxide, dimethyl sulfone, tetramethylene sulfone, tetramethylene sulfoxide, N-formyl pyrrolidine, N-formyl morpholine, N,N'-tetramethylene methanephosphonamide, and the like. Generally speaking, I have found that N,N-dimethyl formamide and N,N-dimethyl acetamide are particularly advantageous solvents. The amount of my new resinous compositions in the solvent can be varied from 25 to 40 percent or even higher in some cases, such solutions or dopes being especially well adapted to practical spinning operations.

What I claim is:

1. A process for preparing a resinous fiber-forming graft copolymer which comprises heating a polymerization reaction mixture comprising (1) water, (2) a peroxide polymerization catalyst and (3) from 40 to 5 parts by weight of a homopolymer of a compound represented by the following general formula:

(1) 

wherein one of R and $R_1$ represents an alkyl group containing from 1 to 4 carbon atoms, the other of R and $R_1$ represents a member selected from the group consisting of a hydrogen atom and an alkyl group containing from 1 to 4 carbon atoms, and $R_3$ represents a member selected from the group consisting of a hydrogen atom and a methyl group, the said homopolymer having been formed in and not separated from said mixture and containing, in polymerized form, from 70 to 100% of the said compound originally present in said mixture, with (4) from 60 to 95 parts by weight of a monomer mixture consisting of from 85.0 to 99.5% by weight of acrylonitrile and 15.0 to 0.5% by weight of a monomer selected from the group consisting of:

(2) 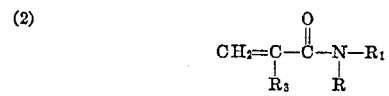

(3) 

(4) 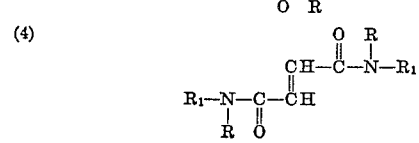

(5) 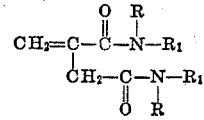

(6) 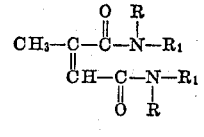

(7) 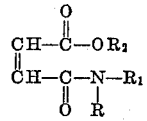

(8) 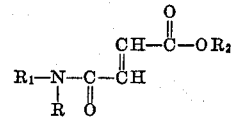

(9) 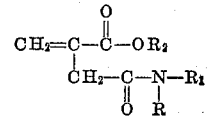

(10) 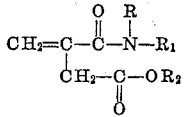

(11) 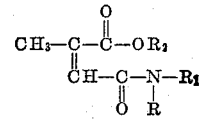

(12) 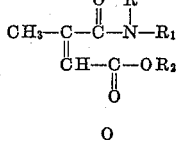

(13) 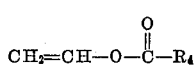

and

(14) $$CH_2=CH-O-\overset{O}{\underset{\|}{C}}-R_4$$

wherein R and $R_1$ each represents a member selected from the group consisting of a hydrogen atom and an alkyl group containing from 1 to 4 carbon atoms, $R_2$ represents an alkyl group containing from 1 to 4 carbon atoms, $R_3$ represents a member selected from the group consisting of a hydrogen atom and a methyl group and $R_4$ represents an alkyl group containing from 1 to 3 carbon atoms, vinyl chloride, vinylidene chloride, styrene, and methacrylonitrile, until 70% to approximately 100% of the said monomers have been combined with the said homopolymer to give the said graft copolymer.

2. A resinous fiber-forming graft copolymer obtained according to the process of claim 1.

3. A process for preparing a resinous fiber-forming graft copolymer which comprises heating a polymerization reaction mixture comprising (1) water, (2) a peroxide polymerization catalyst and (3) from 40 to 5 parts by weight of poly-N-isopropyl-acrylamide formed in and not separated from said mixture and containing, in polymerized form, from 70 to 100% of the monomeric N-isopropylacrylamide originally present in said mixture, with (4) from 60 to 95 parts by weight of a monomer mixture consisting of from 85.0 to 99.5% by weight of acrylonitrile and from 15.0 to 0.5% by weight of N-isopropylacrylamide until from 70% to approximately 100% of the said monomers have combined with said homopolymer to give the said graft copolymer.

4. A resinous fiber-forming graft copolymer obtained according to the process of claim 3.

5. A process for preparing a resinous fiber-forming graft copolymer which comprises heating a polymerization reaction mixture comprising (1) water, (2) a peroxide polymerization catalyst and (3) from 40 to 5 parts of weight of poly-N-methylmethacrylamide formed in and not separated from said mixture and containing, in polymerized form, from 70 to 100% of the monomeric N-methylmethacrylamide originally present in said mixture, with (4) from 60 to 95 parts by weight of a monomer mixture consisting of from 85.0 to 99.5% by weight of acrylonitrile and from 15.0 to 0.5% by weight of N-methylmethacrylamide, until from 70% to approximately 100% of the said monomers have combined with said homopolymer to give the said graft copolymer.

6. A resinous fiber-forming graft copolymer obtained according to the process of claim 5.

7. A process for preparing a resinous fiber-forming graft copolymer which comprises heating a polymerization reaction mixture comprising (1) water, (2) a peroxide polymerization catalyst and (3) from 40 to 5 parts by weight of poly-N-methyl-acrylamide formed in and not separated from said mixture and containing, in polymerized form, from 70 to 100% of the monomeric N-methylacrylamide originally present in said mixture, with (4) from 60 to 95 parts by weight of a monomer mixture consisting of from 85.0 to 99.5% by weight of acrylonitrile and from 15.0 to 0.5% by weight of N-methylacrylamide, until from 70% to approximately 100% of the said monomers have combined with said homopolymer to give the said graft copolymer.

8. A resinous fiber-forming graft copolymer obtained according to the process of claim 7.

9. A process for preparing a resinous fiber-forming graft copolymer which comprises heating a polymerization reaction mixture comprising (1) water, (2) a peroxide polymerization catalyst and (3) from 40 to 5 parts by weight of poly-N-isopropylacrylamide formed in and not separated from said mixture and containing, in polymerized form, from 70 to 100% of the monomeric N-isopropylacrylamide originally present in said mixture, with (4) from 60 to 95 parts by weight of a monomer mixture consisting of from 85.0 to 99.5% by weight of acrylonitrile and from 15.0 to 0.5% by weight of vinyl chloride, until from 70% to approximately 100% of the said monomer have combined with said homopolymer to give the said graft copolymer.

10. A resinous fiber-forming graft copolymer obtained according to the process of claim 9.

11. A process for preparing a resinous fiber-forming graft copolymer which comprises heating a polymerization reaction mixture comprising (1) water, (2) a peroxide polymerization catalyst and (3) from 40 to 5 parts by weight of poly-N-methylmethacrylamide formed in and not separated from said mixture and containing, in poylmerized form, from 70 to 100% of the monomeric N-methylmethacrylamide originally present in said mixture, with (4) from 60 to 95 parts by weight of a monomer mixture consisting of from 85.0 to 99.5% by weight of acrylonitrile and from 15.0 to 0.5% by weight of vinyl chloride, until from 70% to approximately 100% of the said monomers have combined with said homopolymer to give the said graft copolymer.

12. A resinous fiber-forming graft copolymer obtained according to the process of claim 11.

References Cited in the file of this patent

UNITED STATES PATENTS

| | | |
|---|---|---|
| 2,123,599 | Fikentscher et al. | July 12, 1938 |
| 2,649,434 | Coover et al. | Aug. 18, 1953 |
| 2,657,191 | Coover et al. | Oct. 27, 1953 |
| 2,666,025 | Nozaki | Jan. 12, 1954 |
| 2,666,042 | Nozaki | Jan. 12, 1954 |
| 2,735,830 | Coover | Feb. 21, 1956 |

FOREIGN PATENTS

| | | |
|---|---|---|
| 999,594 | France | Oct. 3, 1951 |